United States Patent [19]

Tampa

[11] 4,308,733
[45] Jan. 5, 1982

[54] SECURITY DEVICE FOR AUTOMOBILE SPARE TIRES

[76] Inventor: George R. Tampa, 1935 Midland, Highland Park, Ill. 60035

[21] Appl. No.: 961,121

[22] Filed: Nov. 16, 1978

[51] Int. Cl.³ .............. B62D 43/06; E05B 67/38; E05B 73/00; F16B 39/08
[52] U.S. Cl. .................................. 70/259; 70/230; 70/232; 224/42.24; 224/42.25; 248/552; 411/209
[58] Field of Search ............... 70/259, 232, 230, 229, 70/258, 58, 51, 54, 418; 151/5, 27; 224/42.25, 42.24, 42.06; 248/552, 503, 499; 296/37.2; 403/108; 411/209

[56] References Cited

U.S. PATENT DOCUMENTS

| 566,050 | 8/1896 | Woodward | 151/27 |
|---|---|---|---|
| 2,304,515 | 12/1942 | Turnbull | 70/259 X |
| 3,747,783 | 7/1973 | Long | 224/42.25 X |
| 3,749,295 | 7/1973 | Palmer | 70/54 X |
| 3,808,851 | 5/1974 | Kargus et al. | 70/232 |
| 3,979,035 | 9/1976 | Huot | 224/42.25 |
| 4,003,228 | 1/1977 | Lievens et al. | 70/58 |
| 4,007,863 | 2/1977 | Norris | 70/259 X |
| 4,041,738 | 8/1977 | Vann | 70/232 X |
| 4,066,231 | 1/1978 | Bahner et al. | 70/58 X |
| 4,111,344 | 9/1978 | MacDonald | 224/42.24 |
| 4,153,188 | 5/1979 | Seymour | 224/42.25 X |

FOREIGN PATENT DOCUMENTS

| 18379 | 11/1956 | Fed. Rep. of Germany | 296/37.2 |
|---|---|---|---|
| 1944890 | 3/1971 | Fed. Rep. of Germany | 70/259 |
| 1957228 | 5/1971 | Fed. Rep. of Germany | 403/108 |
| 691756 | 7/1930 | France | 151/5 |
| 909527 | 1/1946 | France | 403/108 |

Primary Examiner—Roy D. Frazier
Assistant Examiner—Carl F. Pietruszka
Attorney, Agent, or Firm—Robert W. Beart

[57] ABSTRACT

This invention relates to an improvement in tire locks and more specifically to devices which make spare tires in the trunk compartment of an automobile almost tamperproof from the standpoint of their removal by unauthorized persons.

3 Claims, 4 Drawing Figures

SECURITY DEVICE FOR AUTOMOBILE SPARE TIRES

BACKGROUND OF THE INVENTION

This invention is necessitated by the present trend noted by the inventor that spare tires in the trunks of automobiles have become almost an "article in commerce" being readily available by access to the trunk compartment when leaving keys in an auto parking lot, by reason of trunk opening switches available as an accessory for many cars and because of the ease with which trunks of automobiles can be readily opened by the use of a screw driver, with a hammer, or other simple tool devices.

Therefore, it is an object of this invention to provide a device which will make it far more difficult to remove the spare tire from an automobile by an unauthorized person. It is a further object of this invention to accomplish the object noted above with a minimum of change in present automobile installations and further to accomplish the desired security with a minimum of expense.

SUMMARY OF THE INVENTION

I have shown a security device for use with a tired wheel when the tired wheel is in the usual compartment or trunk of an automobile. The usual tired wheel 2 installation of which I am apprised consists of a strap or eye-bolt 4 mounted on the floor of the automobile 6 immediately beneath the tired wheel. A hook-like device 10 is coupled to a strap with a stem or body portion 12 which extends upwardly through the opening of the wheel structure. A usual installation includes utilizing the jack base 14 to cover the wheel opening, the base having an aperture in its center 15 through which the body portion of the stud projects. For securement of the tire, a thumb nut 16 or other similar device is threaded at 17 at the distal end of the hook 18 until it is in overlying and adjacently positioned to the cover plate or jack base 14 thus securing the tired wheel 2 against random movement in the trunk space or preventing noises which might be occasioned by vibration of the trunk deck relative to the wheel.

DETAILED DESCRIPTION OF THE PREFERRED EMBODIMENTS

Figure 1:
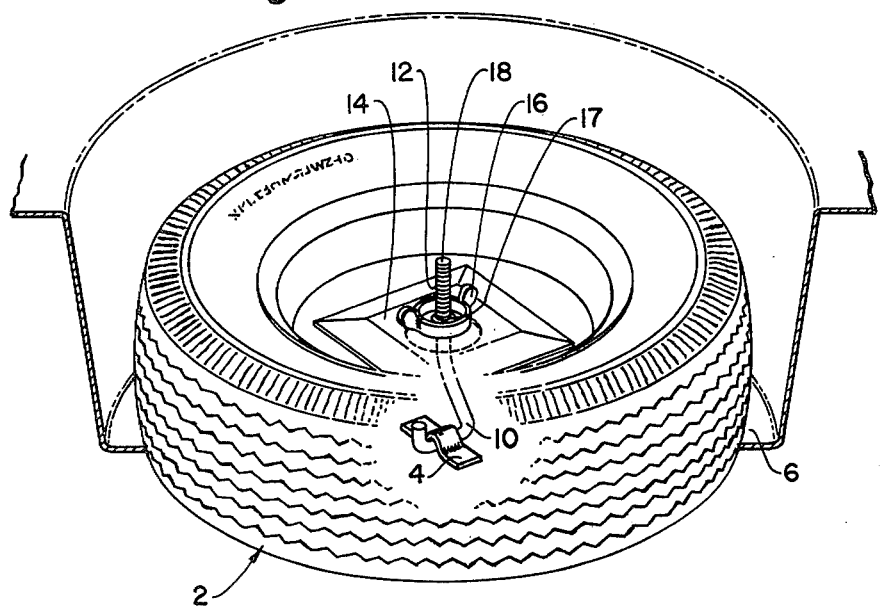
FIG. 1 is a perspective view of a spare wheel and tire anchored in the well of a vehicle by a conventional means and considered to be prior art.
Figure 2:
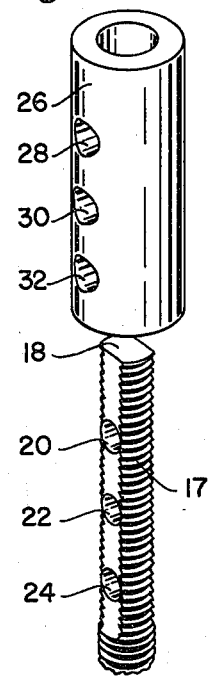
FIG. 2 is a perspective view showing the details of the apertured tubular collar and the apertured threaded end portion.
Figure 3:
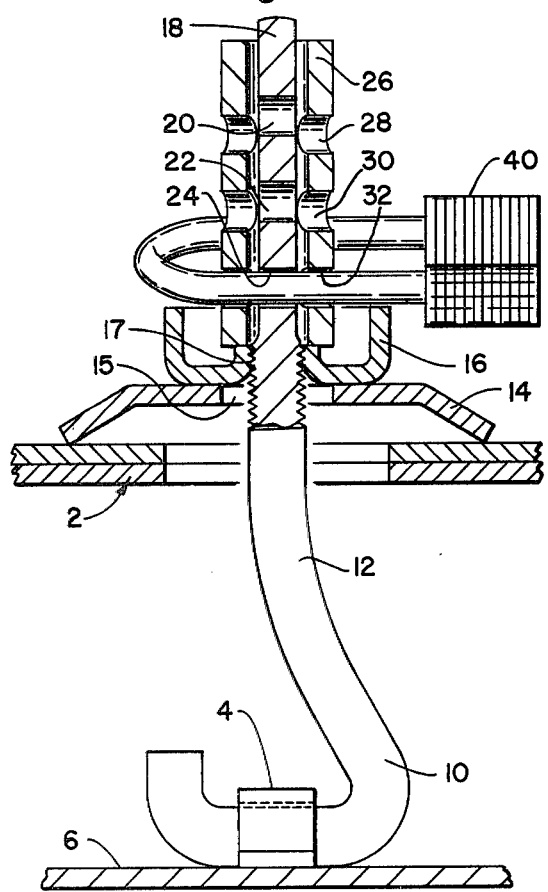
FIG. 3 is a fragmentary side view of the present invention with the locking means shown in section.

In the instant invention and its preferred and simplest form, I intend to utilize a hook-shaped element 10 with an extending stud 12 almost identical to the present device used in automobiles. Reference to FIGS. 2 and 3 shows the changes which I have in mind which basically are four. In its simplest form, I would merely place a plurality of drilled holes 20, 22, 24 transverse to the axis of the threaded stud and in the vicinity of the threads 17 normally accepting the thumb nut 16. The tire wheel 2 would be mounted in the same position as shown in FIG. 1, the cover plate or jack base 14 would traverse the opening in the wheel, and the threaded stud or body portion 12 with the axially-spaced transversely arranged apertures 20, 22 and 24 would extend through the cover plate 14 and accept the thumb nut 16 as shown in FIG. 3. The threaded body portion 17 can be flattened to facilitate drilling apertures 20, 22 and 24 to save material and to help orient the apertures 20, 22 and 24 relative to the collar and apertures therein about to be described.

I now propose, in addition to the aforementioned apertured stud 12, a tubular collar 26 having a longitudinal axis, which collar is provided with a series of apertures 28, 30 and 32 preferably of different spacing (see FIG. 3) than the axial spacing of the apertures in the stud to give varied combinations of spacing relative to the apertured stud 12 on which it may be mounted switching it end for end for assurance of alignment with one of the apertures 20, 22 or 24. This collar could be conveniently dropped down over the extending free end of the threaded stud 12 and one of the apertures 28, 30 or 32 in the collar 26 could align itself substantially with an aperture in the stud through which the arm of a lock 40 could be placed. If properly accomplished and providing the collar is made of a hardened material and not being capable of being readily sawed with a hack saw or the like or otherwise readily destroyed, you have now prevented a person intent on taking the tire from either removing the thumb nut or breaking off the extending end of the stud because of the shielding and supporting effect which the collar 26 affords or of obtaining access to the stud 12 above the thumb nut 16 with a hack saw blade or the like to sever the stud and thus preventing unauthorized removal of the tire. I have personally made such a device and installed and tested it in my automobile and find it an inexpensive and readily workable device to thwart the tampering with or the removal of the spare tire of an automobile.

Figure 4:
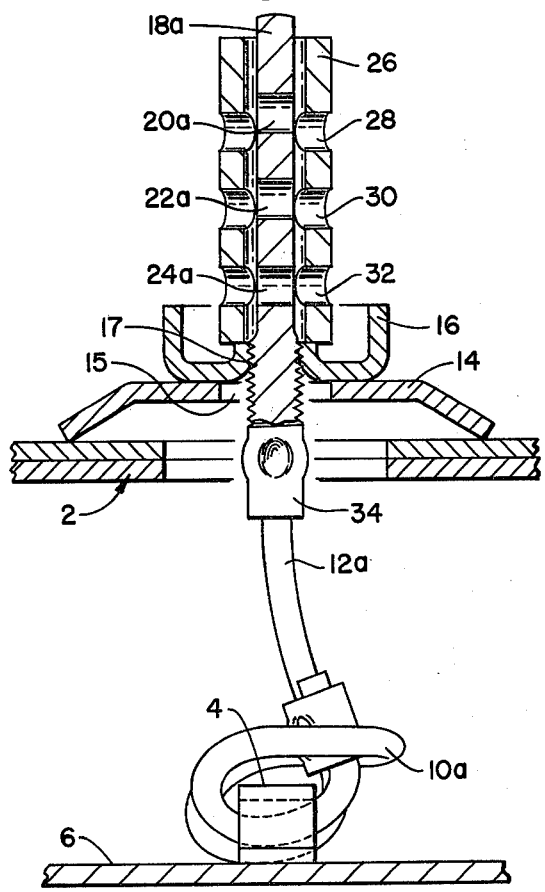
FIG. 4 is a fragmentary side view of an alternate embodiment of the present invention with the locking means shown in section.

In a second embodiment, but similar in operation to the device first shown, I have made a similar device from a braided or stranded cable 12a with a loop 10a created at one end as seen in FIG. 4 which permits ready assembly of the cable to the strap or stud 12a with the loop 10a secured to the strap of the trunk 4 and readily installed at the time of manufacture of the vehicle or even subsequent to manufacture of the car. On the other or distal end of the cable, I have secured by brazing a cylindrical body 34 which can connect cable 12a to an integral hardened threaded stud element 18a to produce a device similar to the first embodiment. Obviously, this secondary form may contemplate, if desired, the elimination of the use of a threaded nut 16. A collar 26a can be slipped over the threaded stud element and a lock inserted through one of the apertures 20a, 22a or 24a. Alternatively, the secondary form can be used with a wing nut 16a much as shown in FIG. 1 with the collar inserted over the integral hardened stud element to retain the nut in its secured position against the jack base 14 and with apertures aligned a lock may be inserted as shown in FIG. 3 causing the collar 26a to be retained axially relative to the hardened stud element 18a.

To those acquainted with the art, it will be readily appreciated that this is an improvement utilizing the features of present installations but vastly improving their operativeness in use. Stated another way, it has taken a fastener installation which is totally without a security function or purpose and transforms that device into a tamperproof security device capable of assuring inability to remove the tired wheel from the automobile by unauthorized personnel. Obviously, if desired, the lock can be made compatible with the trunk lock so that the use of an additional key is avoided.

I claim:

1. A security device for a spare tire including a body portion having hook-shaped anchoring means at one end to permit nonrotative removable attachment of said body portion to a complementary base element in the trunk of a vehicle, said body portion at its other end being provided with a pair of helical thread sections on opposite surfaces of the periphery of said body portion, each helical thread section is separated from the other by a pair of flattened surfaces provided on said body portion, and a series of spaced apertures provided in the flattened surfaces of said body generally normal to the longitudinal axis of said body portion, said body portion of said device, when cooperating with the complementary base element in the trunk of a vehicle, is adapted to be positioned to pass upwardly through the complementary aperture in a tired wheel, an apertured cover plate adapted to overlie the complementary aperture of said tired wheel with the other end of said body portion passing upwardly through the aperture of said plate with the threaded portions of said body extending through and beyond said cover plate, a nut body cooperable with the threaded portion of said body to put said body portion in tension and thereby position and clamp the spare tire relative to the trunk of the vehicle, and a collar telescopically positioned relative to the end portion of said body, said collar having a plurality of pairs of apertures spaced along the length thereof, the spacing between each successive pair of apertures in the collar being less than the distance between any of the spaced apertures in the body, said collar being rotatable to align a pair of the apertures in the collar with one of the differentially spaced holes in the body and adapted to generally overlie said nut body in close proximity, and a locking element passed through the aligned apertures in the said body portion and said collar to prevent upward movement of said nut relative to said body portion and the clamped tired wheel assembly.

2. A security device for spare tires in vehicles including a body portion consisting of a flexible cable provided with a closed end loop at one end thereof for removable anchored engagement with a complementary base element in the trunk of a vehicle, the distal end of said body portion being provided with a threaded element joined to said flexible cable, said threaded element provided with a series of spaced apertures therein, a threaded nut element receivable on said threaded element thereby enabling the drawing of the flexible cable into a tensioned condition, a portion of the threaded portion of the body at its terminal end being provided with flat surfaces on opposite sides of said body portion and interrupting the continuous nature of said threads, a hardened collar having an internal diameter greater than the external diameter portions of said body and provided with opposed apertures in the surfaces thereof and adapted to be placed over the threaded body portion, and locking means capable of passing through at least one of said spaced apertures in said body portion and a pair of the said apertures in said collar to fix said collar against movement relative to the body portion of said security device.

3. A security device of the type contemplated in claim 2 wherein the collar has a plurality of spaced pairs of opposed apertures along the length thereof, the spacing of each pair from one another being a distance less than the spacing of any two apertures in the body portion.

* * * * *